US012289322B2

(12) United States Patent  
Levy et al.

(10) Patent No.: US 12,289,322 B2  
(45) Date of Patent: Apr. 29, 2025

(54) SYSTEM AND METHOD FOR CONNECTED VEHICLE SECURITY INCIDENT INTEGRATION BASED ON AGGREGATE EVENTS

(71) Applicant: Upstream Security, Ltd., Herzliya (IL)

(72) Inventors: Yoav Levy, Kfar-Vitkin (IL); Yonatan Appel, Ramat Hasharon (IL); Dan Sahar, Belmont, CA (US)

(73) Assignee: Upstream Security, Ltd., Herzliya (IL)

( * ) Notice: Subject to any disclaimer, the term of this patent is extended or adjusted under 35 U.S.C. 154(b) by 251 days.

(21) Appl. No.: 16/890,671

(22) Filed: Jun. 2, 2020

(65) Prior Publication Data

US 2020/0389474 A1    Dec. 10, 2020

Related U.S. Application Data

(60) Provisional application No. 62/857,393, filed on Jun. 5, 2019.

(51) Int. Cl.  
    *G06F 21/55*            (2013.01)  
    *H04L 9/40*             (2022.01)  
    (Continued)

(52) U.S. Cl.  
    CPC ........ *H04L 63/1416* (2013.01); *G06F 21/552* (2013.01); *G06F 21/554* (2013.01);  
    (Continued)

(58) Field of Classification Search  
    CPC .. B60R 16/023; B60R 16/0231; G06N 20/00; H04L 63/1441; H04L 63/1408;  
    (Continued)

(56) References Cited

U.S. PATENT DOCUMENTS 9,697,355 B1    7/2017   Park et al.  
11,477,212 B2 *   10/2022   Appel ................ H04L 63/1441  
(Continued)

FOREIGN PATENT DOCUMENTS

EP             3197730 B1      2/2020  
WO     WO-2019227076 A1 *   11/2019        H04L 12/40013  
WO     WO-2020124950 A1 *   6/2020

OTHER PUBLICATIONS

National Highway Traffic Safety Administration. (Oct. 2016). Cybersecurity best practices for modern vehicles. (Report No. DOT HS 812 333). Washington, DC: Author. (Year: 2016).*

(Continued)

*Primary Examiner* — Zhimei Zhu  
(74) *Attorney, Agent, or Firm* — M&B IP Analysts, LLC

(57) ABSTRACT

A system and method for connected vehicle security incident integration. The method includes correlating a security incident violation with a connected vehicle, wherein the security incident violation is indicated in security incident data collected by at least one connected vehicle security system of the connected vehicle, wherein the security incident violation indicates a deviation from normal operation of the connected vehicle; enriching security incident data of a connected vehicle with cybersecurity data related to at least one of: the connected vehicle, and communications between the connected vehicle and at least one external system; generating a risk assessment for the connected vehicle based on the enriched violation data; and performing at least one mitigation action with respect to the connected vehicle based on the risk assessment.

19 Claims, 3 Drawing Sheets

(51) Int. Cl.
  *H04L 67/12* (2022.01)
  *H04W 4/40* (2018.01)
(52) U.S. Cl.
  CPC .......... *H04L 63/1441* (2013.01); *H04L 67/12* (2013.01); *H04W 4/40* (2018.02)
(58) Field of Classification Search
  CPC . H04L 63/1466; H04L 67/12; H04L 63/1416; H04L 63/1425; H04L 63/1433; H04W 4/40; H04W 12/121
  See application file for complete search history.

(56) References Cited

U.S. PATENT DOCUMENTS

| | | | | |
|---|---|---|---|---|
| 11,539,724 | B2* | 12/2022 | Appel | H04L 63/1441 |
| 2013/0227648 | A1 | 8/2013 | Ricci | |
| 2015/0052018 | A1* | 2/2015 | O'Conner | G06Q 30/0623 705/26.61 |
| 2017/0230385 | A1* | 8/2017 | Ruvio | H04W 12/12 |
| 2018/0255082 | A1* | 9/2018 | Ostergaard | H04W 12/122 |
| 2018/0351980 | A1* | 12/2018 | Galula | H04L 63/1416 |
| 2019/0222652 | A1* | 7/2019 | Graefe | H04W 84/18 |
| 2019/0306180 | A1* | 10/2019 | Dyakin | H04W 4/40 |
| 2020/0389453 | A1* | 12/2020 | Kamir | G06F 21/554 |
| 2021/0074088 | A1* | 3/2021 | McQuade | G06F 3/0656 |
| 2021/0101618 | A1* | 4/2021 | Levy | H04W 12/121 |
| 2021/0232687 | A1* | 7/2021 | Sasaki | H04L 67/12 |
| 2021/0344700 | A1* | 11/2021 | Ueno | H04L 67/12 |

OTHER PUBLICATIONS

Barry Sheehan, Finbarr Murphy, Martin Mullins, Cian Ryan, "Connected and autonomous vehicles: A cyber-risk classification framework," Transportation Research Part A: Policy and Practice, vol. 124, pp. 523-536. (Year: 2019).*

Kelarestaghi, Kaveh Bakhsh, Mahsa Foruhandeh, Kevin Heaslip, and Ryan Gerdes. "Intelligent transportation system security: impact-oriented risk assessment of in-vehicle networks." IEEE Intelligent Transportation Systems Magazine 13, No. 2 (2019): 91-104. (Year: 2019).*

* cited by examiner

SYSTEM AND METHOD FOR CONNECTED VEHICLE SECURITY INCIDENT INTEGRATION BASED ON AGGREGATE EVENTS

CROSS-REFERENCE TO RELATED APPLICATIONS

This application claims the benefit of U.S. Provisional Application No. 62/857,393 filed on Jun. 5, 2019, the contents of which are hereby incorporated by reference.

TECHNICAL FIELD

The present disclosure relates generally to cybersecurity for connected vehicles, and more specifically to integrating security incident data from different connected vehicles to detect and mitigate cybersecurity threats.

BACKGROUND

With advances in computer technology, computerized navigation and control systems in vehicles have been created to improve drivers' experiences and to allow for remotely controlled transportation of people and goods. To this end, computerized control and management services may collect data remotely from systems deployed in vehicles. For example, a navigation system installed in a vehicle may collect and upload (e.g., via a cellular network) telemetry data such as mechanical data related to components of the vehicle, location data, functional data related to vehicle activities (e.g., movements, use of horn, etc.), and the like. Prior to introduction of such computerized control and management systems, collection of such data was not possible.

While computerized control and management systems can be incredibly useful for vehicle operators, these systems leave vehicles exposed to new dangers. Specifically, malicious entities can control vehicle functions and, therefore, may misappropriate the vehicle for their own purposes. This opens the door to vehicle failure, theft, and other malicious activity, which can lead to death, injury, and financial damage.

To avoid these dangers, some third-party threat detection tools have been developed. These third-party threat detectors collect data from a connected vehicle and detect potentially malicious activity for each vehicle based on its respective data. For example, such malicious activity may include data, communication, and behavior anomalies, risks, and incidents. Each connected vehicle includes computing components and communicates with one or more external entities to send collected data, receive alerts, and the like. As connected vehicles become more prominent, more advanced connected vehicle cybersecurity solutions become increasingly desirable.

Existing threat detectors are limited in that they are typically only exposed to partial vehicle data and, even when exposed to a large amount of data for a particular vehicle, only detect threats based on data for that single vehicle. Additionally, such existing solutions are limited in their ability to process large quantities of data from different sources. As a result, such existing threat detectors may fail to detect some threats, mis-prioritize threats, fail to accurately determine root causes of threats, or inefficiently process threats.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for connected vehicle security incident integration. The method comprises: correlating a security incident violation with a connected vehicle, wherein the security incident violation is indicated in security incident data collected by at least one connected vehicle security system of the connected vehicle, wherein the security incident violation indicates a deviation from normal operation of the connected vehicle; enriching security incident data of a connected vehicle with cybersecurity data related to at least one of: the connected vehicle, and communications between the connected vehicle and at least one external system; generating a risk assessment for the connected vehicle based on the enriched violation data; and performing at least one mitigation action with respect to the connected vehicle based on the risk assessment.

Certain embodiments disclosed herein also include a non-transitory computer readable medium having stored thereon causing a processing circuitry to execute a process, the process comprising: correlating a security incident violation with a connected vehicle, wherein the security incident violation is indicated in security incident data collected by at least one connected vehicle security system of the connected vehicle, wherein the security incident violation indicates a deviation from normal operation of the connected vehicle; enriching security incident data of a connected vehicle with cybersecurity data related to at least one of: the connected vehicle, and communications between the connected vehicle and at least one external system; generating a risk assessment for the connected vehicle based on the enriched violation data; and performing at least one mitigation action with respect to the connected vehicle based on the risk assessment.

Certain embodiments disclosed herein also include a system for connected vehicle security incident integration. The system comprises: a processing circuitry; and a memory, the memory containing instructions that, when executed by the processing circuitry, configure the system to: correlate a security incident violation with a connected vehicle, wherein the security incident violation is indicated in security incident data collected by at least one connected vehicle security system of the connected vehicle, wherein the security incident violation indicates a deviation from normal operation of the connected vehicle; enrich security incident data of a connected vehicle with cybersecurity data related to at least one of: the connected vehicle, and communications between the connected vehicle and at least one external system; generate a risk assessment for the connected vehicle based on the enriched violation data; and perform at least one mitigation action with respect to the connected vehicle based on the risk assessment.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
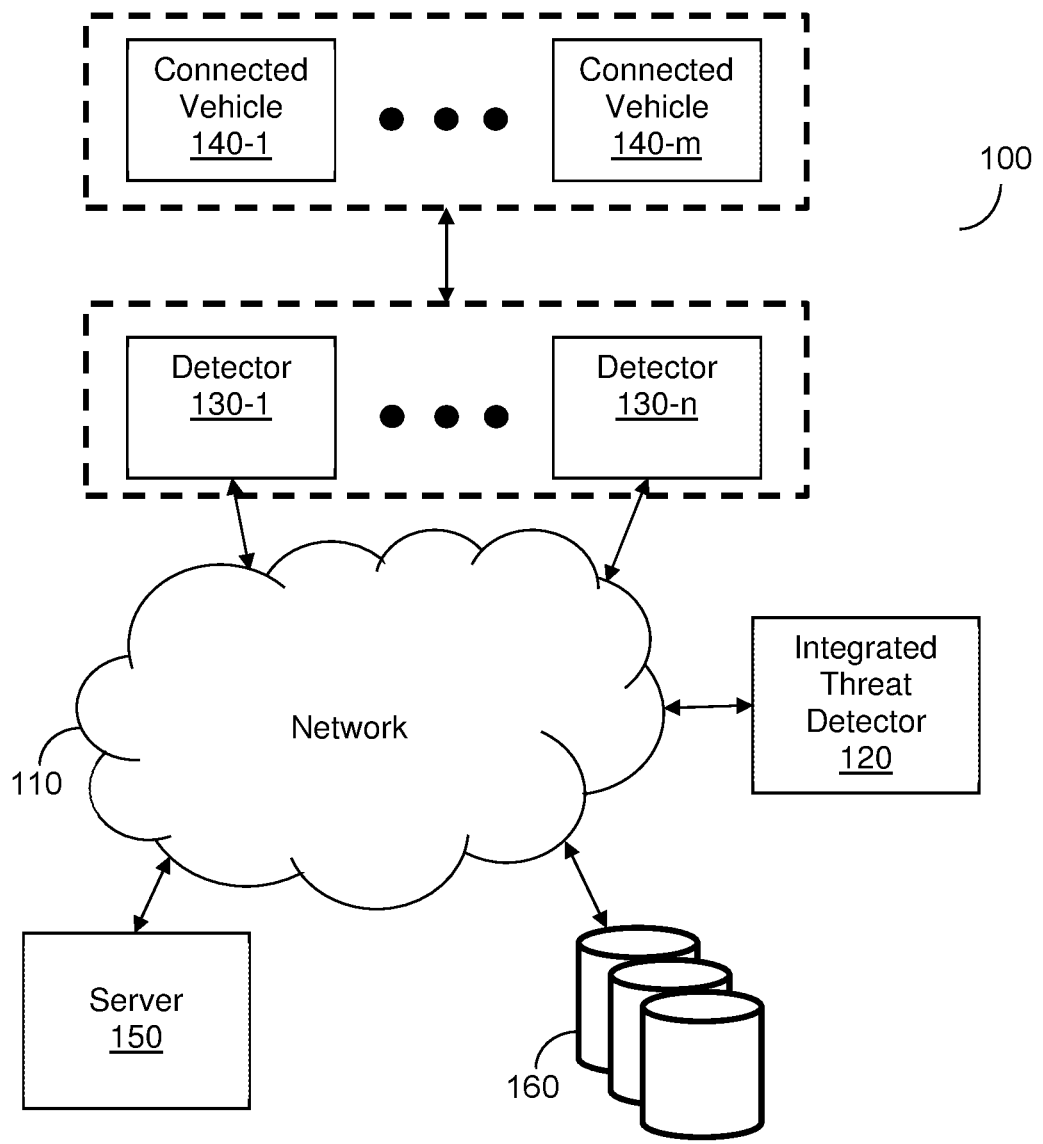
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

It has been identified that third-party threat detectors are capable of detecting threats based on data collected by connected vehicles, but existing solutions are not capable (or have limited capability) of contextualizing the connected vehicle data beyond identifying abnormalities in specific vehicles. Additionally, cybersecurity threats that have not yet manifested as unusual vehicle behavior for a particular vehicle or group of vehicles are not detected by such existing solutions.

The disclosed embodiments provide techniques for integrating connected vehicle security incident data with contextual cybersecurity data related to the connected vehicle, other connected vehicles, servers, or other external systems communicating with connected vehicles. This integration of external entity data with security incident data allows for, among other things, preventing or mitigating cybersecurity threats that have not yet manifested as unusual driving behavior for a particular vehicles, or mitigating cybersecurity threats that have begun manifesting but have not been detected by security incident systems in the connected vehicle.

Additionally, the disclosed embodiments provide techniques for correlating connected vehicle violations to known vehicles. Identifying vehicles associated with specific violations allows for accurate correlation of connected vehicle violations with external entity data, and further allows for identifying cybersecurity threats that may be applicable to broader sets of vehicles.

The various disclosed embodiments include a method and system for connected vehicle security incident integration. Data from connected vehicle security systems is collected and normalized into a unified format. The collected data includes security incident data indicating security incident violations by connected vehicles. The security incident violations are violations of rules defining abnormal operations of the vehicle and may be based on, for example, predetermined rules indicating abnormal operation, definitions of normal operation for which deviations therefrom are abnormal, both, and the like. The normalized data is correlated to identifiers of one or more connected vehicles, operators, external systems, or a combination thereof. The violations data is enriched with contextual cybersecurity data related to the connected vehicle, external system, or both.

Based on the enriched data, a prioritized risk assessment is generated for each of one or more connected vehicles. Analytics may be generated based on commonalities among connected vehicles having risk scores above a threshold. Based on the prioritized risk scores, mitigation actions are performed. The mitigation actions may include, but are not limited to, causing a third-party threat detector to perform in-vehicle actions. Such in-vehicle threat detector actions may include mitigation actions involving controlling the connected vehicle, modifying data collection activities, or both.

The risk assessments may be generated for connected vehicles indicated in the security incident data, connected vehicles that were not indicated in the security incident data, or both. To this end, it has been identified that external contextual data regarding cybersecurity threats or threats to other vehicles may be utilized to identify potential threats to vehicles that are not explicitly identified in security incident data. Accordingly, the disclosed embodiments also allow for detecting threats for a connected vehicle without necessarily analyzing data collected by the connected vehicle itself or otherwise prior to such threats manifesting as security incident data for the connected vehicle. This, in turn, may allow for preventing such threats before they occur.

FIG. 1 is an example network diagram 100 utilized to describe various disclosed embodiments. In the example network diagram 100, an integrated threat detector 120 communicates with a plurality of connected vehicle violation detectors (also referred to as detectors) 130-1 through 130-n (hereinafter referred to as a TPD 130 or as TPDs 130 for simplicity) and a server 150 over a network 110. In some embodiments, the integrated threat detector 120 also communicates with one or more contextual cybersecurity data sources 160 over the network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The detectors 130 may be, but are not limited to, threat detectors installed in or communicating with connected vehicles 140-1 through 140-m (hereinafter referred to as a connected vehicle 140 or as connected vehicles 140 for simplicity). Such detectors 130 may include, but are not limited to, in-vehicle cybersecurity tools, network or application security threat detectors, offline analytics threat detectors, risk analysis tools, data analysis tools, security information and events management (SIEM) systems, device security systems, application security systems, user or entity behavioral analytics systems, security operations, analysis and reporting (SOAR) systems, combinations thereof, and the like.

The detectors are 130 configured to identify connected vehicle security incident violations based on data collected by the connected vehicles 140. The security incident violations may be used to generate events or messages indicating the violations. In an example implementation, at least some of the detectors 130 are third-party threat detectors provided by entities other than the entity operating the integrated threat detector 120. Violations detected by such third-party threat detectors 130 may be in different formats and, therefore, may require normalization into a unified format in order to allow for effective aggregation.

The detectors 130 may further include cybersecurity threat detectors configured to detect threats to entities that may affect the connected vehicles 140 (e.g., a telematics server or mobile device communicating with the connected vehicles 140). Because threats to systems communicating with the connected vehicles may eventually result in threats to the connected vehicles themselves (e.g., malware may be spread via such communications), contextualizing the risk assessment with respect to factors such as threats detected for external systems allows for advanced and more accurate threat detection for the connected vehicles.

A connected vehicle 140 is configured to receive and send data, and may be further configured to implement commands in the received data (for example, a "Start_Engine" command). To this end, a connected vehicle 140 includes computer components (not shown) such as, but not limited to, a processing circuitry, a memory, a network interface, and the like. A connected vehicle may be, but is not limited to, a car, a bus, a truck, and the like. The connected vehicles may be at least partially controlled remotely. Data collected by the connected vehicles 140 may include, but is not limited to, telematics, vehicle sensor data, over-the-air (OTA) update data, log analytics, Lidar data, radar data, images, videos, and the like.

In an embodiment, the security incident violations include deviations from normal connected vehicle operation behavior for a vehicle, a group of vehicles, a type of vehicle, or a combination thereof. As a non-limiting example, such mobility violations may include abnormal driving activities of the connected vehicle such as, but not limited to, unusual turns, speeds, stopping, navigation routes, combinations thereof, and the like. In a further embodiment, the mobility violations may be detected as described further in co-pending U.S. patent application Ser. No. 16/047,444, assigned to the common assignee, the contents of which are hereby incorporated by reference.

The server 150 may be a command and control server, a telematics server, or other system configured to communicate with connected vehicles (e.g., one or more of the connected vehicles 140). In an example implementation, the server 150 is configured to at least partially control the connected vehicle(s) it communicates with and, therefore, may be utilized for performing mitigation actions. As a non-limiting example, when a mitigation action involving increasing granularity of data collected by the connected vehicles is determined, the integrated threat detector 120 is configured to send a request for higher granularity data to the server 150, and the server 150 is configured to send a command to one or more connected vehicles to collect higher granularity data in response to receiving the request.

In some implementations, the detectors 130 are configured to send violations to the server 150. To this end, in an embodiment, the integrated threat detector 120 is configured to intercept violations in-flight between the detectors 130 and the server 150. In another embodiment, the violations may be collected from the server 150.

The integrated threat detector 120 is configured to enrich violation data from the detectors 130 with contextual cybersecurity data in accordance with the disclosed embodiments. To this end, in addition to the violation data received from the detectors 130, the integrated threat detector 120 is configured to receive contextual cybersecurity data from, for example, the connected vehicles 140, the server 150, one or more contextual cybersecurity data sources 160, or a combination thereof. The contextual cybersecurity data sources 160 may include any systems or storages that collect or store data which may be indicate symptoms of cybersecurity vulnerabilities or attack attempts that do not manifest or have just started to manifest as abnormal vehicle behavior such as, but not limited to, user devices, other servers communicating with connected vehicles (e.g., servers hosting applications installed on or otherwise accessed by connected vehicles), and the like.

It should be noted that a single server is shown in FIG. 1 merely for simplicity, and that additional servers may be utilized without departing from the scope of the disclosure.

Figure 2:
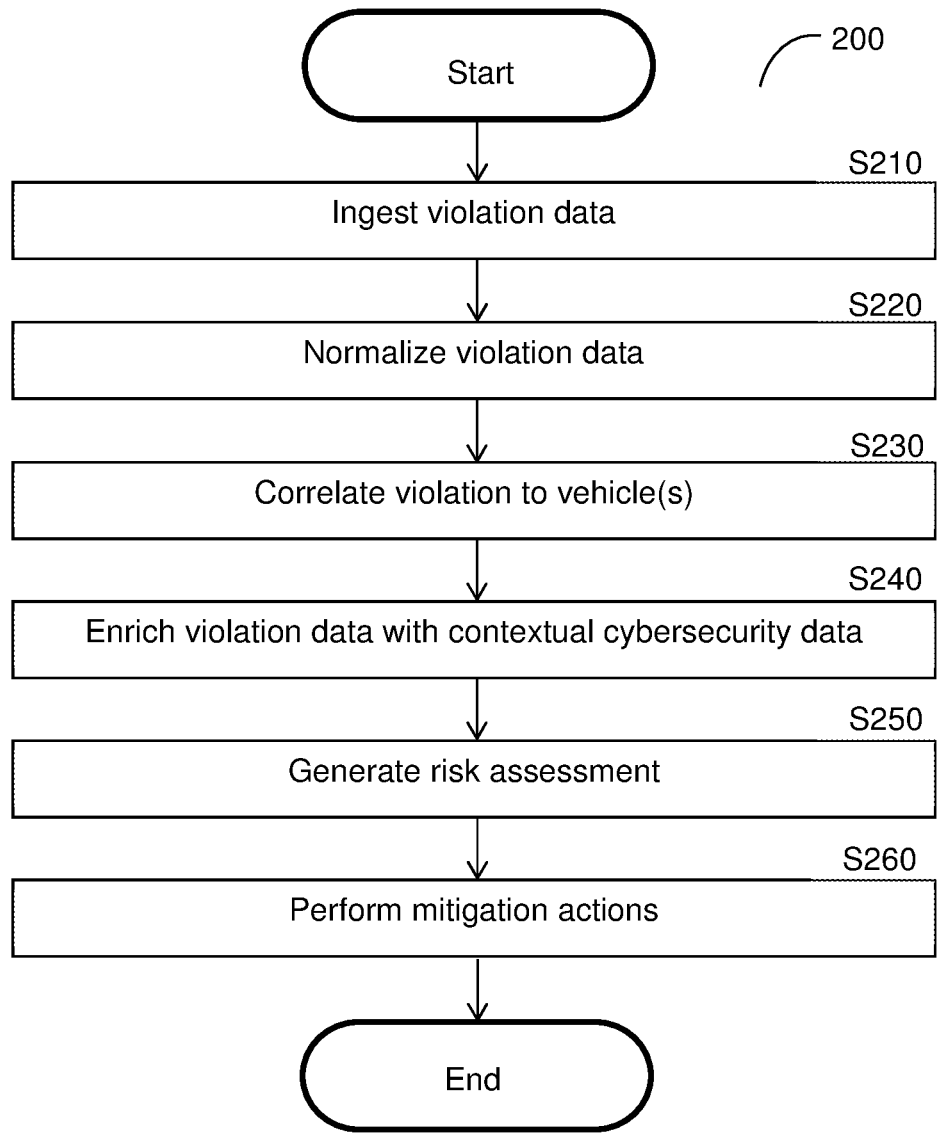
FIG. 2 is a flowchart illustrating a method for performing mitigation actions based on integrated connected vehicle security incident data according to an embodiment.

FIG. 2 is an example flowchart 200 illustrating a method for performing mitigation actions based on integrated connected vehicle security incident data according to an embodiment. In an embodiment, the method is performed by the integrated threat detector 120.

At S210, security incident data is ingested. The security incident data indicates a security incident violation. The security incident violation is a deviation from normal operation of a connected vehicle such as, for example, a cybersecurity incident, a cybersecurity threat, a cybersecurity risk, an anomaly, an abnormal behavior, or other suspicious activity related to one or more connected vehicles. The violation data may indicate mobility violations detected by threat detectors (e.g., the detectors 130, FIG. 1). The violations may be extracted from telemetry messages sent from threat detectors installed on or communicating with vehicles, from telemetry message collection or aggregation services, from $3^{rd}$ party mobility threat detector collection or aggregation services, and the like.

At S220, the ingested security incident data is normalized. In an embodiment, S220 includes determining a type for each of one or more violations and converting each violation into a unified format with respect to its determined type. As a non-limiting example, a violation may be determined as a malformed software update and converted to a unified malformed software update format. The type of each violation may be determined by applying a machine learning model trained based on training data including violations. In some implementations, a first machine learning model may be trained to identify violations as either known or unknown type. The violations may be converted into normalized formats using predetermined rules.

The unified formats may be defined with respect to predetermined fields such that portions of the violation data may be classified with respect to the predetermined fields and inserted into the respective classified fields. In a further embodiment, the classification may be performed by applying a machine learning model trained to classify portions of violation data into different fields.

At S230, based on the normalized violation data, a violation is correlated to one or more known connected vehicles. Correlating a violation with vehicles allows for identifying relevant contextual cybersecurity data for the violation based on other vehicles or systems exhibiting or otherwise related to the violation. The correlation may include enriching the violation data with data indicating an identifier of the correlated vehicle (e.g., an electronic control unit number of an electronic control unit installed in the vehicle).

In an embodiment, the violation is further correlated to all entities in a communications ecosystem of systems communicating with the correlated vehicles. As a non-limiting example, when the violation is correlated to a vehicle among a fleet of vehicles communicating with a server, the violation may be correlated to the other vehicles of the fleet, one or more users of a mobility service, the server, or combinations thereof.

Correlating a violation with systems among a communications ecosystem shared with its correlated vehicle(s) allows for identifying relevant contextual cybersecurity data that may be used to preemptively detect potential threats and other anomaly risks to the vehicle. As a non-limiting example, when a violation is correlated to all systems which have likely communicated with a connected vehicle during the applicable time before or during the violation, cybersecurity data related to communications between the connected vehicle and other systems At S240, based on the correlation, the violation data is enriched with contextual cybersecurity data. Specifically, the violation data is enriched with contextual cybersecurity data related to the vehicles, users, external systems, or a combination thereof, which were correlated thereto. Contextual cybersecurity data is relevant to a vehicle when the contextual cybersecurity data indicates a status or issue of the vehicle or of one or more external systems communicating with the vehicle (e.g., a server sending commands to the vehicle, other vehicles with which the vehicle communicates, a server hosting an application used by the vehicle, a user device sending commands to the vehicle, etc.). Such statuses or issues may include, but are not limited to, update data (e.g., time of last over-the-air update, version installed, etc.), alerts or other threats detected by cybersecurity threat detectors, mobility threats detected for other connected vehicles, error data (e.g., numbers of errors), combinations thereof, and the like.

The contextual cybersecurity data used for the enrichment includes cybersecurity data collected at times defined with respect to times of the violations. Such time-specific cybersecurity data may include cybersecurity data collected during a period of time during which the violation occurred, a period of time prior to the violation occurring, a period of time after the violation occurring, or a combination thereof.

As a non-limiting example, a vehicle's software update history or status (e.g., up-to-date or not up-to-date) may be utilized to enrich the violation data for the vehicle. As another non-limiting example, a vulnerability identified by a cybersecurity system for a command and control server communicating with a vehicle may be utilized to enrich the violation data for the vehicle. As yet another non-limiting example, suspicious user activity detected for a user device communicating with the vehicle may be utilized to enrich the violation data for the vehicle.

In an embodiment, the contextual cybersecurity data may include other mobility or cybersecurity violations data related to a vehicle. Such related mobility violations or cybersecurity data includes violation or anomaly data related to other vehicles that are related to the vehicle such that events on the other vehicle and events on the monitored vehicle could be due to a common root cause. In this regard, it is noted that abnormal mobility events which may be detected as violations lack the context noted above when only provided for a single vehicle, but that a pattern of similar violations among multiple communicating vehicles often indicate a cybersecurity threat affecting and spreading among those vehicles. Thus, in some embodiments. mobility violations data for other vehicles may be used as contextual cybersecurity data.

As a non-limiting example for using mobility violations data as contextual cybersecurity data, when a first vehicle A1 has a mobility violation detected after a firmware over-the-air (FOTA) update and a second vehicle A2 had a similar mobility violation detected after the FOTA update, the mobility violation of vehicle A2 suggests that the vehicles A1 and A2 have been affected by the same cybersecurity threat. This effect is more pronounced as more vehicles (e.g., A3, A4, . . . , A100, etc.) demonstrate the same mobility violation. This effect is even more pronounced when only vehicles which already had the FOTA update are demonstrating this mobility violation. Each vehicle's violation data may be enriched with data indicating the violation by each other vehicle.

At S250, based on the enriched data, a risk assessment is generated for a vehicle or group of vehicles. The risk assessment is generated based on a set of rules defined with respect to factors such as, but not limited to, severity of violation, number of affected vehicles (e.g., the number of connected vehicles correlated to the violation), vehicle type (e.g., make and model, year number, or combination thereof), user, external systems communicating with the vehicle, time of day of violation, date of violation, location of vehicle at time of violation, or a combination thereof. Alternatively or in combination, the risk assessment may be generated using a machine learning model trained to classify or determine risk values based on data related to connected vehicles. Example techniques for determining severity of violations based on contextually enhanced vehicle states are described further in co-pending U.S. patent application Ser. No. 16/451,569, assigned to the common assignee, the contents of which are incorporated by reference.

At S260, based on the generated risk assessment, one or more mitigation actions are performed. The mitigation actions may include, but are not limited to, quarantining a connected vehicle (i.e., such that systems of the connected vehicle do not communicate with external systems), disabling a component or network element of a connected vehicle, sending a notification to an owner or operator of a connected vehicle, blocking communications to or from the vehicle (e.g., communications to or from a server), applying root cause analysis or other advanced investigation techniques, suspending software updates, initiating software updates, blocking services, blocking users, and the like.

The mitigation actions may be determined based on, but not limited to, the risk assessment, timing of cybersecurity events occurring prior to the violations, vehicle(s) which have triggered detection of cybersecurity threats, and the like. Because the risk assessment is based on contextually enriched data, the mitigation actions may be determined based on the combination of the violation and external data (e.g., data related to communications between the connected vehicle and external systems) related to cybersecurity. The mitigation actions may be performed for connected vehicles indicated in the violation data or other connected vehicles (e.g., connected vehicles communicating with connected vehicles indicated in the violation data). For example, based on enrichment data indicating that a server communicating with a connected vehicle has malware installed, mitigation actions may be performed to block such communications with the connected vehicle even when violation data for the connected vehicle is normal.

In an embodiment, S260 may include causing a change in data collection by one or more detectors communicating with the connected vehicle (e.g., one or more of the detectors 130, FIG. 1). As a non-limiting example, the detectors may be reconfigured to collect data differently, either directly (e.g., by changing configuration settings) or indirectly (e.g., by sending commands to change configuration settings).

In this regard, it has been identified that detectors used for detecting mobility violations in connected vehicles are capable of modifying their data collection activities. As a result, data collection by such detectors may be tailored in order to allow for collecting more relevant data and, therefore, more accurate assessments of risk. To this end, S260 may include modifying data collection by, for example, collecting higher volumes of data (e.g., by collecting data more frequently or from more sources of data), broadcasting collected data at higher frequencies, collecting richer data (e.g., collecting more types of data than a default or otherwise prior set of data types), collecting higher granularity data, and the like.

Changing data collection activities by detectors allows for deriving more accurate risk assessments for data. Further, since data collection activities are changed based on risk assessments, computing resources may be preserved by, for example, escalating data collection activities (i.e., to provide better quality or quantity data) only when already-collected data indicates a need for such escalation. Also, since the risk assessments are determined based on violation data enriched with non-vehicle specific cybersecurity data, false negatives may be avoided due to detection of potential cybersecurity vulnerabilities or attempts at cybersecurity attacks that have not yet manifested as unusual vehicle behavior.

The following are various non-limiting examples for performing mitigation actions based on integrated connected vehicle security incident data.

As a first example, a threat detector installed in a first connected vehicle of a fleet of connected vehicles detects a low severity violation and creates a message including violation data. Threat detectors installed in multiple other connected vehicles of the fleet detect the same low severity violation within 15 minutes of each other. The violation data from the first connected vehicle is received and normalized. The violation is correlated to the first connected vehicle based on an ID of the first connected vehicle. The violation is further correlated to the multiple other connected vehicles due to the relationship among vehicles in the fleet. The violation data of the first connected vehicle is enriched with data indicating the number of other vehicles exhibiting the same low severity violation. Based on the enriched data, a medium level risk assessment is determined. A notification indicating the medium level risk is generated and sent, and the detectors in the fleet are reconfigured to more frequently collect violation data.

As a second example, a threat detector installed in a first connected vehicle of a fleet of connected vehicles detects a low severity violation and creates a message including violation data. Threat detectors installed in multiple other connected vehicles of the fleet detect the same low severity violation within 15 minutes of a firmware update for the first connected vehicle. The violation data from the first connected vehicle is received and normalized. The violation is correlated to the first connected vehicle based on an ID of the first connected vehicle. The violation is further correlated to the multiple other connected vehicles due to the relationship among vehicles in the fleet. The violation data of the first connected vehicle is enriched with data indicating the number of other vehicles exhibiting the same low severity violation and with data related to the firmware update for the first connected vehicle. Based on the enriched data, a medium level risk assessment is determined. A root cause analysis is triggered in order to analyze the firmware update code and the firmware update is suspended for vehicles of the fleet that have not yet been updated to this firmware version.

As a third example, a threat detector installed in a connected vehicle detects a medium severity violation and creates a message including violation data. The violation data from the connected vehicle is received and normalized. The violation is correlated to the connected vehicle based on an ID of the connected vehicle. The violation data of the connected vehicle is enriched with data related to communications between the connected vehicle and external devices. Specifically, the communications data indicates that an unknown external device is communicating with the connected vehicle. Based on the enriched data, a high level risk assessment is determined. The unknown external device is blocked from communicating with the connected vehicle.

As a fourth example, violation data indicating receipt of a malformed message by a connected vehicle is received. The malformed message violation is correlated to the connected vehicle and to a server communicating with the connected vehicle. The violation data is enriched with cybersecurity data indicating that an unauthorized user login occurred at the server. A high level risk assessment is determined. The server is quarantined from connected vehicles, and a driver of the vehicle is notified of the incident as required via an in-vehicle display.

Figure 3:
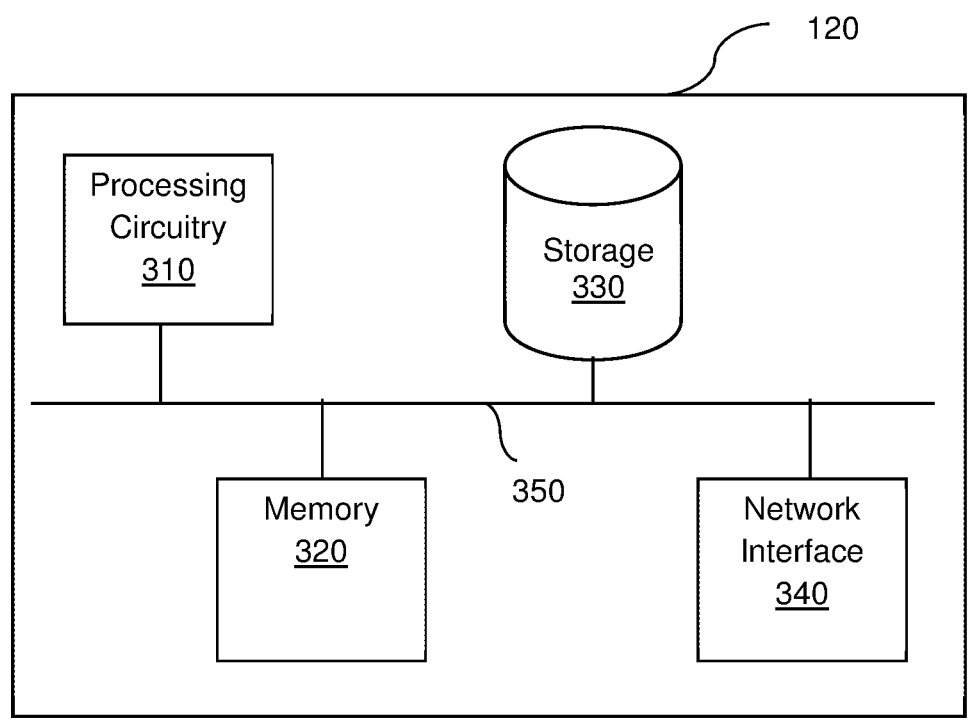
FIG. 3 is a schematic diagram of an integrated threat detector according to an embodiment.

FIG. 3 is an example schematic diagram of the integrated threat detector 120 according to an embodiment. The integrated threat detector 120 includes a processing circuitry 310 coupled to a memory 320, a storage 330, and a network interface 340. In an embodiment, the components of the integrated threat detector 120 may be communicatively connected via a bus 350.

The processing circuitry 310 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 320 may be volatile (e.g., RAM, etc.), non-volatile (e.g., ROM, flash memory, etc.), or a combination thereof.

In one configuration, software for implementing one or more embodiments disclosed herein may be stored in the storage 330. In another configuration, the memory 320 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 310, cause the processing circuitry 310 to perform the various processes described herein.

The storage 330 may be magnetic storage, optical storage, and the like, and may be realized, for example, as flash memory or other memory technology, CD-ROM, Digital Versatile Disks (DVDs), or any other medium which can be used to store the desired information.

The network interface 340 allows the integrated threat detector 120 to communicate for the purpose of, for example, receiving violations data, sending commands, and the like.

It should be understood that the embodiments described herein are not limited to the specific architecture illustrated in FIG. 3, and other architectures may be equally used without departing from the scope of the disclosed embodiments.

It should also be noted that various embodiments mention connected vehicles, and that such connected vehicles may be any kind of vehicles including, but not limited to, cars, trucks, boats, planes, as well as robots.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for contextual connected vehicle security incident integration, comprising:
   correlating a security incident violation with a connected vehicle, wherein the security incident violation is indicated in security incident data collected by at least one connected vehicle security system of the connected vehicle, wherein the security incident violation indicates a deviation from normal operation of the connected vehicle;
   enriching the security incident data of the connected vehicle with cybersecurity data based on the correlation in order to create enriched security incident data;
   generating a risk assessment for the connected vehicle based on the enriched security incident data; and
   performing at least one mitigation action with respect to the connected vehicle based on the risk assessment.

2. The method of claim 1, wherein the at least one connected vehicle security system of the connected vehicle is among a communications ecosystem, wherein systems among the communications ecosystem communicate with each other, further comprising:
   correlating the security incident violation to each system among the communications ecosystem such that the cybersecurity data used for enriching the security incident data includes data related to communications within the communications ecosystem.

3. The method of claim 2, wherein the communications ecosystem includes a fleet of connected vehicles, wherein the cybersecurity data used for enriching the security incident data includes a number of connected vehicles including systems among the communications ecosystem exhibiting the same type of security incident violation.

4. The method of claim 1, wherein correlating the security incident violation with the connected vehicle further comprises enriching the security incident data with an identifier of the connected vehicle.

5. The method of claim 1, further comprising:
   normalizing the security incident data, wherein normalizing the security incident data further comprises converting at least a portion of the security incident data into a unified format based on a type of the security incident violation.

6. The method of claim 1, wherein the security incident violation is a mobility violation indicating at least one abnormal driving activity of the connected vehicle.

7. The method of claim 1, wherein the cybersecurity data includes at least one of: update data, at least one alert by a cybersecurity threat detector, at least one cybersecurity threat detected for at least one other connected vehicle, at least one mobility threat detected for at least one other connected vehicle, and error data.

8. The method of claim 1, wherein the at least one mitigation action includes reconfiguring at least one detector of the connected vehicle with respect to data collection based on the enriched security incident data.

9. The method of claim 1, wherein the at least one mitigation action includes quarantining the connected vehicle from at least one external system.

10. A non-transitory computer readable medium having stored thereon instructions for causing a processing circuitry to execute a process, the process comprising:
    correlating a security incident violation with a connected vehicle, wherein the security incident violation is indicated in security incident data collected by at least one connected vehicle security system of the connected vehicle, wherein the security incident violation indicates a deviation from normal operation of the connected vehicle;

enriching the security incident data of the connected vehicle with cybersecurity data based on the correlation in order to create enriched security incident data;

generating a risk assessment for the connected vehicle based on the enriched security incident data; and performing at least one mitigation action with respect to the connected vehicle based on the risk assessment.

11. A system for contextual connected vehicle security incident integration, comprising:

a processing circuitry; and a memory, the memory containing instructions that, when executed by the processing circuitry, configure the system to:

correlating a security incident violation with a connected vehicle, wherein the security incident violation is indicated in security incident data collected by at least one connected vehicle security system of the connected vehicle, wherein the security incident violation indicates a deviation from normal operation of the connected vehicle;

enriching the security incident data of the connected vehicle with cybersecurity data based on the correlation in order to create enriched security incident data;

generating a risk assessment for the connected vehicle based on the enriched security incident data; and performing at least one mitigation action with respect to the connected vehicle based on the risk assessment.

12. The system of claim 11, wherein the at least one connected vehicle security system of the connected vehicle is among a communications ecosystem, wherein systems among the communications ecosystem communicate with each other, wherein the system is further configured to:

correlate the security incident violation to each system among the communications ecosystem such that the cybersecurity data used for enriching the security incident data includes data related to communications within the communications ecosystem.

13. The system of claim 12, wherein the communications ecosystem includes a fleet of connected vehicles, wherein the cybersecurity data used for enriching the security incident data includes a number of connected vehicles including systems among the communications ecosystem exhibiting the same type of security incident violation.

14. The system of claim 11, wherein correlating the security incident violation with the connected vehicle further comprises enriching the security incident data with an identifier of the connected vehicle.

15. The system of claim 11, wherein the system is further configured to:

normalize the security incident data, wherein normalizing the security incident data further comprises converting at least a portion of the security incident data into a unified format based on a type of the security incident violation.

16. The system of claim 11, wherein the security incident violation is a mobility violation indicating at least one abnormal driving activity of the connected vehicle.

17. The system of claim 11, wherein the cybersecurity data includes at least one of: update data, at least one alert by a cybersecurity threat detector, at least one cybersecurity threat detected for at least one other connected vehicle, at least one mobility threat detected for at least one other connected vehicle, and error data.

18. The system of claim 11, wherein the at least one mitigation action includes reconfiguring at least one detector of the connected vehicle with respect to data collection based on the enriched security incident data.

19. The system of claim 11, wherein the at least one mitigation action includes quarantining the connected vehicle from at least one external system.

* * * * *